United States Patent [19]

Suzuki et al.

[11] 3,744,890

[45] July 10, 1973

[54] SYSTEM FOR SEARCHING FOR DESIRED INFORMATION

[75] Inventors: Koichi Suzuki, Kanagawa; Hajime Yamashita, Tokyo, both of Japan

[73] Assignee: Kabushiki Kaisha Ricoh, Tokyo, Japan

[22] Filed: Oct. 9, 1970

[21] Appl. No.: 79,373

[52] U.S. Cl. .................................................. 353/26

[51] Int. Cl. ............................................ G03b 23/12

[58] Field of Search ................. 353/25, 26, 27, 122; 226/33; 340/259, 263; 250/219 F, 219 D, 219 FR

[56] References Cited

UNITED STATES PATENTS

| | | | |
|---|---|---|---|
| 3,299,272 | 1/1967 | Furukawa | 250/219 D |
| 3,290,987 | 12/1966 | James | 353/26 |
| 3,248,029 | 4/1966 | Money | 353/26 |
| 3,539,254 | 11/1970 | Smitzer | 353/95 |
| 2,482,242 | 9/1949 | Brustman | 353/26 |
| 3,322,961 | 5/1967 | Harrison | 250/219 |

*Primary Examiner*—Louis R. Prince
*Assistant Examiner*—A. J. Mirabito
*Attorney*—McGlew and Toren

[57] ABSTRACT

A system for searching for desired recorded information, such as records on relatively long lengths of microfilm, is effective both to select a group of frames containing the desired information and to select the particular frame or frames within the group containing the desired information. The microfilm is provided, along one marginal edge, with an identification mark correlated with each frame and having a transparency different from that of the remainder of the film margin, and the microfilm is further provided with additional identification marks along the opposite margin of the microfilm, of the same type as those along the first mentioned margin, and each related to a group of frames. Respective photoelectric transducer means scan both sets of identification marks and provide output pulses which are supplied to a counting circuit. When the film is moving in an arbitrary forward direction, the output pulses are counted and compared with a preset number set in a register. When the microfilm is moving in the opposite direction, the pulses are subtracted and compared with the preset number in the register. The register is connected to a comparator which is also connected to the pulse counter, and the comparator controls a means for moving the microfilm in either the forward direction or the reverse direction.

9 Claims, 5 Drawing Figures

INVENTORS
KOICHI SUZUKI
HAJIME YAMASHITA

BY McGlew and Toren
ATTORNEYS

PATENTED JUL 10 1973 3,744,890

INVENTORS
KOICHI SUZUKI
HAJIME YAMASHITA

BY Mc Glew and Toren
ATTORNEYS

SYSTEM FOR SEARCHING FOR DESIRED INFORMATION

BACKGROUND OF THE INVENTION

A so-called information recording medium, such as a microfilm, permits the storage of a large amount of information in a limited space, and it is well known that a large number of recorded information items, such as documents, drawings, etc., can be photographed successively on a long length of microfilm, or the like, for the purpose of preservation.

Heretofore, it has been customary to provide, on the information recording medium, respective identification marks for each individual frame. When it is desired to extract an information record, any desired frame can be selected through the use of these identification marks, and the information presented by projecting on a screen or by photographic enlargement.

Microfilm and other similar information recording media are generally so constituted that the content of one page of a book is reduced and recorded in one frame of the medium. Thus, when one item of information corresponds to the content of several pages of the book, the record, on the medium, generally involves a series of frames. In most cases, no single item of information is restricted to only one frame and, in most cases, the record or recording of one item of information covers several frames.

The conventional method of selecting a desired portion of a record by relying on respective marks, each associated with only one frame, has disadvantages in that it is time-consuming when the desired information involves a number of frames because a large number of marks must be identified. Additionally, it is necessary to check on the title of the information in order to properly select the frames.

Assuming that here is an information recording medium having 500 frames, a frame identification mark will be provided for each of the frames and the number of frame identification marks will total 500.

In apparatus having no means for selecting frame groups, there will be a need to provide index numbers which are as follows:

| Contents | No. |
|---|---|
| (1) | 1 |
| (2) | 2 |
| (3) | 3 |
| (4) | 4 |
| . | . |
| . | . |
| . | |
| (497) | 497 |
| (498) | 498 |
| (499) | 499 |
| (500) | 500 |

If frame selection means is used in such apparatus for selecting frame groups, the index numbers used will be something like the ones described below. In such case, the frames will be divided, for instance, into five groups or Group I (1 to 5), Group II (6 to 121), Group III (122 to 411), Group IV (412 to 422) and Group V (423 to 500).

| Titles | No. |
|---|---|
| (Group I) | 1 |
| (Group II) | 6 |
| (Group III) | 122 |
| (Group IV) | 412 |
| (Group V) | 423 |

It will be seen that, although the index numbers are only for five groups, numerals having three digits, or Group V . . . "423," for example, are required as index numbers, and that the numerals themselves are not continuous and occur at intervals. Generally, a microfilm is formed with 100 to 1,000 frames. Thus, the index numbers become complex when the numerals have a large number of digits, and make it necessary to use a memory and a counter of a large capacity. This is highly disadvantageous.

SUMMARY OF THE INVENTION

This invention is related to microfilm recording and, more particularly, to a novel and improved system for extracting desired information and in which desired portions of records on microfilm or other information recording media may be readily selected.

An objective of the invention is the provision of a system for searching, or extracting, desired information and adapted for use in selecting any desired portions of records from microfilms or other information recording media, and which system permits accurate and prompt extraction of any desired portion of a record of information contained in one frame as well as a record of information contained in a number of successive frames. In accordance with the invention, the first selection, for each item of information, involves the series of frames, hereinafter referred to as a "frame group," in which the item of information is recorded in instalments. Following this, each single frame of the group is selected as desired. With the invention system, it is possible to select frames of a record, from an information recording medium having a large capacity, by using a counter recorder device of relatively small capacity.

More specifically, in accordance with the invention the searching system for desired information, recorded on microfilm or the like, includes identification marks for frames provided in one portion of an information recording medium, with each frame including an installment of the information. Frame group identification marks, for frame groups corresponding to the entire content of one item of recorded information, are provided in another portion of the information recording medium. The frame identification marks and the frame group identification marks are read out by means of respective photoelectric transducers.

If frame group identification marks are used as in the present invention, the index numbers required for selecting frame groups can be simplified and they will be as follows:

| Titles | No. |
|---|---|
| (Group I) | 1 |
| (Group II) | 2 |
| (Group III) | 3 |
| (Group IV) | 4 |
| (Group V) | 5 |

Thus, the present invention enables handling a large amount of information carried by an information recording medium by means of a memory and a counter of a relatively small capacity. By using frame selecting means in addition to frame group selecting means, it is possible directly to locate a certain frame of a certain frame group according to the invention. The selecting and locating speed is very high and the apparatus used is simplified.

The advantages offered by the invention can be summarized as follows:

a. If the summary of contents of a group of frames is carried by the first frame space of the group, it will be possible to learn the contents of the group to a certain extent by merely selecting and locating the frame group. The selection and location of the next group of frames can be performed in the same manner, thereby increasing selecting speed;

b. A frame group can be selected readily after a frame is selected;

c. There is no need to handle numerals having a large number of digits when selection of frames or frame groups is carried out by electronic means;

d. If a frame group identification mark is attached to a specific frame, the frame can be located quickly; and e. When the information recorded in a microfilm is in the form of pages of periodicals in reduced scale, it is possible to select and locate any page of any number as desired.

An object of the invention is to provide an improved system for selecting or extracting information from recording media containing large numbers of information items.

Another object of the invention is to provide such a system in which a frame group corresponding to the desired information may be readily selected, after which one or more single frames within the group may also be readily selected.

A further object of the invention is to provide such a system in which the selection is effected substantially automatically.

For an understanding of the principles of the invention, reference is made to the following description of a typical embodiment thereof as illustrated in the accompanying drawing.

DESCRIPTION OF A PREFERRED EMBODIMENT

Figure 1:
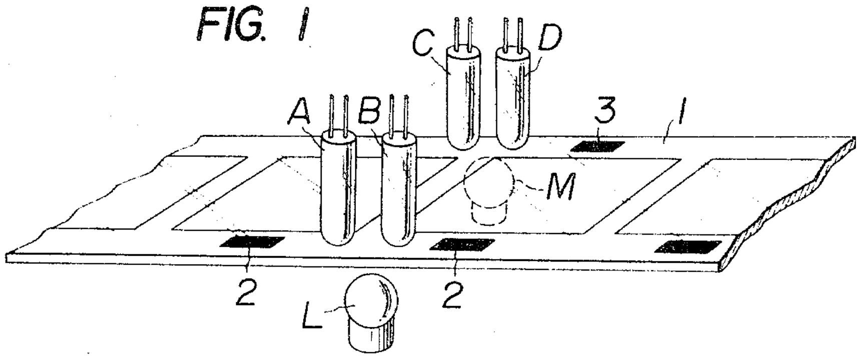
FIG. 1 is a partial perspective view illustrating an information detection system embodying the invention.

Referring to FIG. 1, a relatively long information recording medium 1, such as a microfilm or microjacket, has sequentially arranged frames each containing specific recorded information. A first pair of photoelectric transducer elements A and B are disposed above one marginal portion of recording medium 1, and a second pair of photoelectric transducer elements C and D are disposed above the other marginal portion of medium 1. The two elements of each set of elements are arranged in tandem longitudinally of the path of travel of recording medium 1. A first light source L, for illumination, is disposed on the opposite side in medium 1 in association with transducer elements A and B, and a second light source M is disposed on the opposite or underside of medium 1 for cooperation with transducer elements C and D.

On that marginal portion of recording medium 1 associated with transducer elements A and B, each frame is provided with a respective frame detection mark 2 and, on that marginal portion of recording medium 1 associated with transducer elements C and D, each frame group is provided with a frame group identification mark 3. Marks 2 and 3 have predetermined lengths, and may be of any type which has a light transparency different from that of the surrounding portions of recording medium 1. These marks may be provided, for example, by making the corresponding portions of the microfilm opaque, by making the corresponding marginal portions of the film partially transparent, or by utilizing transparent portions of the microfilm between adjacent frames. The lengths of marks 2 and 3 are selected to be greater than the distance between the respective transducer elements A, B and C, D. If the marks have lengths smaller than the distance between the associated photoelectric transducer elements, a magnifying lens (not shown) may be used to compensate for the difference.

Figure 2:
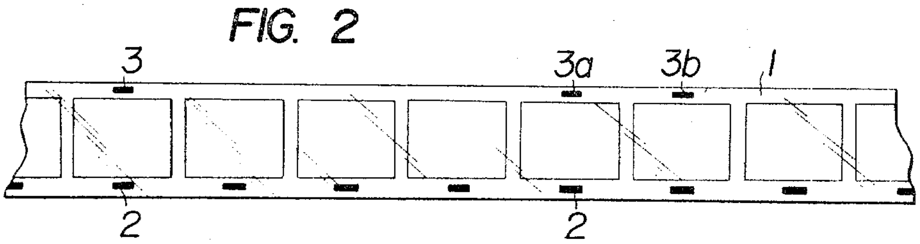
FIG. 2 is a plan view of microfilm as used with the system of the invention.

While frame identification marks 2 are provided for each frame of the film, as shown in FIG. 2, frame group identification or detection marks 3 are provided only adjacent the first frame of a series of frames in which one item of information is recorded in installments. When the content of one item of information is sufficiently small that it can be recorded in a single frame, the frame group identification marks 3 naturally will be provided adjacent to successive frames. For example, frame group identification mark 3*a* adjacent a single frame containing all the content of one item of information is disposed immediately adjacent the next following frame group identification mark 3*b* indicating the first frame of a series of frames containing one item of information recorded in installments.

On the assumption that recording medium 1 may be moved either from left to right or from right to left, as viewed in FIGS. 1 and 2, light from source L will pass through medium 1 and be incident on transducer elements A and B, and light from source M will pass through medium 1 and be incident on transducer elements C and D. Thus, when each mark 2 is aligned with light source L and with photoelectric transducer elements A and B, and also when each mark 3 is aligned with light source M and photoelectric transducer elements C and D, during movement of recording medium 1, there occur changes in the quantity of light passing through medium 1. Such changes are detected by the photoelectric transducer elements A, B, C and D, and are shaped into wave form pulses by the system shown in block form in FIG. 3. The shaped pulses are taken out as signal pulses *a*, *b*, *c* and *d* corresponding to the respective photoelectric transducer elements A, B, C and D, as shown in FIGS. 4 and 5.

Figure 4:
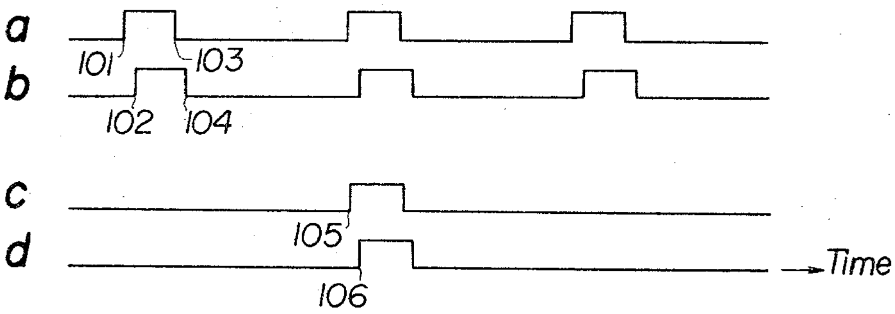
FIGS. 4 and 5 are graphical illustrations of the detection pulses produced by the system of the invention.
Figure 5:
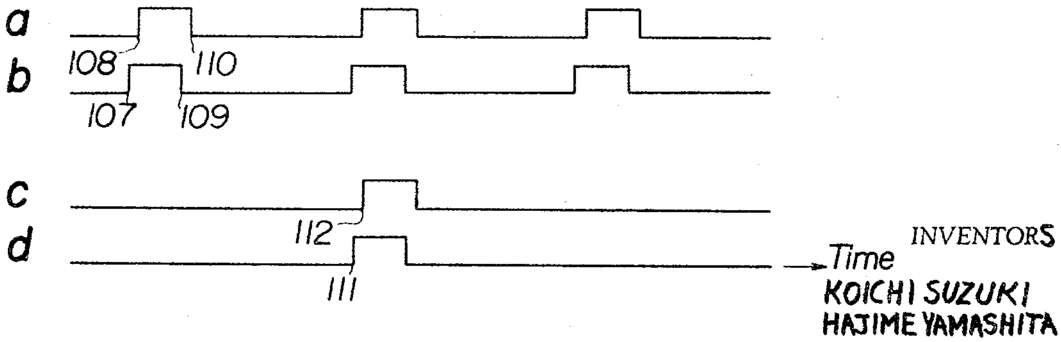

If it is assumed arbitrarily that movement of medium 1 from left to right in FIG. 1 is a forward movement and movement from right to left is a reverse movement, then, during forward movement of medium 1, signal pulse *a* precedes signal pulse *b*, and signal pulse *c* precedes signal pulse *d*, as shown in FIG. 4. On the other hand, in reverse travel of medium 1, signal pulse *b* precedes signal pulse *a* and signal pulse *d* precedes signal pulse *c*, as shown in FIG. 5. This is due to the order of arrangement of photoelectric transducer elements A, B and C, D.

The operation of the system of the invention will now be explained with reference to FIGS. 3, 4 and 5. In FIG. 4, the points, in time, at which signal pulses *a*, *b*, *c* and

*d* are produced are designated 101, 102, 105 and 106, respectively, and the points in time at which the signal pulses *a* and *b* disappear are designated 103 and 104, respectively. Similarly, in FIG. 5, the points in time, at which signal pulses *a*, *b*, *c* and *d* are produced are designated 108, 107, 112 and 111, respectively, and the points, in time, at which signal pulses *a* and *b* disappear are designated 110 and 109, respectively.

1. DISCRIMINATION BETWEEN DIRECTIONS OF MOVEMENT OF THE RECORDING MEDIUM

Figure 3:
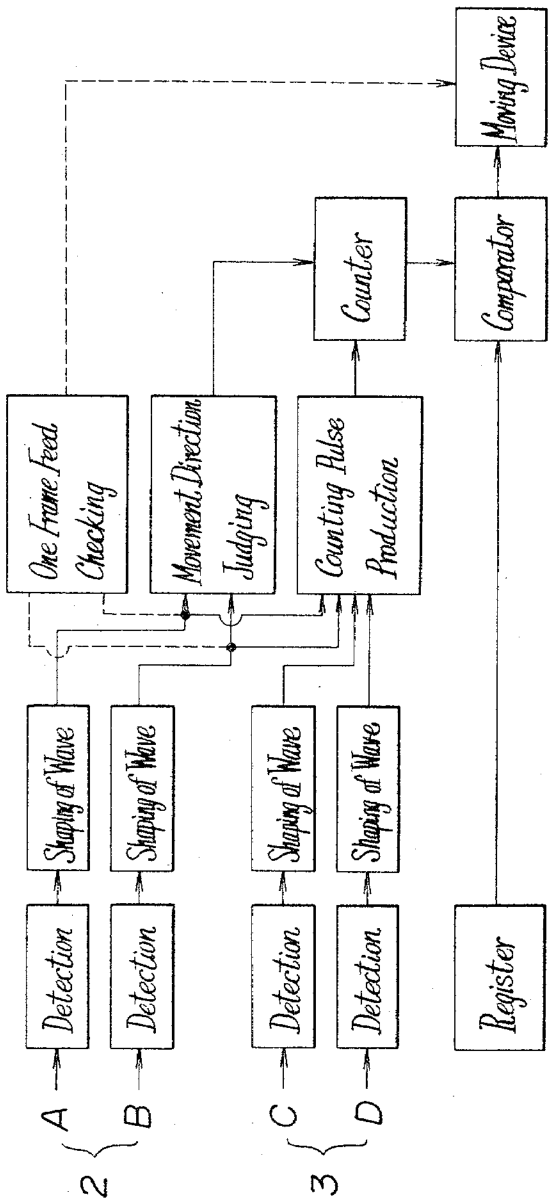
FIG. 3 is a block diagram of the information detecting system of the invention.

If signal pulse *a* disappears (at 103) earlier than signal pulse *b* (at 104), as shown in FIG. 4, then medium 1 is considered as moving in a forward direction, so that a command signal to effect addition is transmitted to a counter circuit (See FIG. 3).

If signal pulse *b* disappears (at 109) earlier than signal pulse *a* (at 110), as shown in FIG. 5, then medium 1 is considered as moving in the reverse direction, so that a command signal to effect subtraction is transmitted to the counter circuit (see FIG. 3).

2. COUNTING OF THE NUMBER OF FRAME GROUP IDENTIFICATION MARKS

If signal pulse *d* is produced (at 106) when signal pulses *c* and *a* have already been produced, as shown in FIG. 4, or if signal pulse *c* is produced (at 112) when signal pulses *d* and *b* have already been produced as shown in FIG. 5, then respective counting pulses are produced by the counting circuit of FIG. 3. Addition is effected responsive to the command signal "add," and subtraction is effected responsive to the command signal "subtract." The results are stored.

3. OVERALL DECISION

The number corresponding to an information record to be selected is stored in a register, as shown in FIG. 3, and compared with the results of counting effected by a counter, also as shown in FIG. 3. If the number counted is smaller than the number of the desired record, then a command to move the information recording medium in the forward direction is issued to a medium moving section of FIG. 3. If the number counted is greater than the number of the desired record, then a command to move the medium in reverse direction is issued to the medium moving section. If the two numbers agree, movement of the medium is terminated.

4. MOVEMENT OF THE MEDIUM BY ONE FRAME

Referring to FIG. 3, checking on the movement of the medium by one frame is effected through a channel shown in broken lines. For example, if the signal pulse *b* is produced (at 102) when signal pulse *a* has already been produced, then the medium is considered to have been moved by one frame. If necessary, the movement of the medium by one frame is also counted.

Referring more specifically to FIG. 3, each of the photoelectric transducer elements A, B, C and D provides an input to a respective detection block whose output is supplied to a respective wave shaping block. The outputs of the wave shaping blocks associated with transducers A and B are applied to a movement direction judging block and also to a counting pulse production block. The outputs of the wave shaping blocks associated with the transducers C and D are applied only to the counting pulse production block. The output of the movement direction judging block and the output of the counting pulse production block are applied to a counter block whose output is supplied as one input of a comparator block, with the other input of the comparator block being supplied from the register block. The output of the comparator block is supplied to the moving device block to control movement and the direction of movement of the recording medium 1. For single frame checking, the outputs of the wave shaping blocks associated with the transducers A and B are supplied, as indicated in broken lines, to the one frame feed checking block whose output is supplied to the moving device block.

From the foregoing description, it will be appreciated that the provision, in an information recording medium, of frame group identification marks each associated with the record of a single item of information contained in a number of frames, in addition to frame identification marks, each associated with a record of one item of information contained in a single frame, permits accurate and prompt selection of any desired record of a single item of information contained in a number of frames, by identifying only one frame group mark for the desired record instead of identifying all the frame marks of the involved frames. Thus, it is possible to select any desired portions of information records from an information recording medium of large capacity by means of a counter storage device of relatively small capacity.

It will be apparent that the positions of the information recording marks, namely the frame identification marks and the frame group identfcation marks, are not limited to the opposite marginal portions of the recording medium, and the marks may be provided anywhere on the medium where they will not interfere with the recording of information. However, it should be noted that, when such positions have been selected, the marks should be provided in the same position on all of the recording mediums because of the arrangement of the photoelectric transducer elements relative to the positions of the identification marks.

While a specific embodiment of the invention has been shown and described in detail to illustrate the application of the principles of the invention, it will be understood that the invention may be embodied otherwise without departing from such principles.

What is claimed is:

1. A system for selectively retrieving recorded information from long recording media having information recorded thereon in successive frames, said system comprising, in combination, frame identification marks, each associated with a single frame, located on one marginal portion of each medium; frame group identification marks, each associated with a single item of information recorded in at least one frame, located on another marginal portion of each medium; a pair of first transducer elements operable to scan said frame identification marks as a medium is moved longitudinally past said first transducer elements; a pair of second transducer elements operable to scan said frame group identification marks as the medium is moved longitudinally past said second transducer elements; the transducer elements of each pair being arranged in spaced tandem relation longitudinally of the path of movement of a medium; respective detecting means connected to each transducer element and operable to provide output pulses respective to each identification mark scanned by the associated transducer element;

medium movement direction sensing means connected to the detecting means connected to said first transducer elements and operable to sense the direction of medium movement in accordance with the sequence of first pulses produced by scanning of said frame identification marks by said first transducer elements; pulse counting means connected to said detecting means and to said medium movement direction sensing means to count the number of successively scanned second pulses produced by scanning of said frame group identification marks by said second transducer elements; comparator means connected to said pulse counting means and operable to compare the number of frame groups counted with the number of frame groups corresponding to a record to be selected, and to issue a command to move the medium in a forward direction, when the number of frame groups counted is smaller than the number corresponding to the record to be selected, to move the medium in a reverse direction when the number of frame groups counted is greater than the number corresponding to the record to be selected, and to stop movement of the medium when the two numbers agree with each other; and moving means connected to said comparator means and receiving commands issued by said comparator means, said moving means being operable to move the medium longitudinally past said transducer elements in either the forward or the reverse direction, and to stop movement of the medium at a preselected frame group.

2. A system for selectively retrieving recorded information, as claimed in claim 13, including single frame checking means connected to the outputs of only the detecting means connected to said first transducer elements; and connected to said moving means, to step the recording medium by one frame at a time within the frame group corresponding to the record to be selected.

3. A system for selectively retrieving recorded information, as claimed in claim 1, in which said pulse counting means produces frame group counting pulses responsive to detection of a frame group identification mark when all the frame identification marks and one frame group identification mark, associated with one frame group, have been detected; said comparator means comparing the frame group counting pulses with the frame identification pulses to effect control of the travel of the medium.

4. A system for selectively retrieving recorded information, as claimed in claim 1, in which said frame identification marks and said frame group identification marks constitute the only recorded information identification marks on each medium.

5. A system for selectively retrieving recorded information, as claimed in claim 1, in which said identification marks are relatively elongated; the longitudinal spacing of the transducer elements of each pair being less than the length of the associated identification marks.

6. A system for selectively retrieving recorded information, as claimed in claim 5, in which said transducer elements are photoelectric transducer elements, and the recording medium is a microfilm; said transducer elements being positioned adjacent one surface of a microfilm; a first light source adjacent the other surface of the microfilm in alignment with said first transducer elements; and a second light source positioned adjacent the other surface of said microfilm in alignment with said second transducer elements.

7. A system for selectively retrieving recorded information, as claimed in claim 6, in which said identification marks comprise areas of the microfilm having a transparency different from that of the remaining area of the microfilm.

8. A system for selectively retrieving recorded information, as claimed in claim 1, in which said comparator means includes a counter connected to said movement direction sensing means and to said counting means and operable, when a medium is moving in a forward direction, to add the counted pulses and, when a medium is moving in a reverse direction, to subtract the counted pulses.

9. A system for selectively retrieving recorded information, as claimed in claim 8, in which said comparator means includes a register containing said preselected number; said comparator being connected to said register, said counter and said moving means.

* * * * *